(12) United States Patent
Yokoyama et al.

(10) Patent No.: US 12,030,394 B2
(45) Date of Patent: Jul. 9, 2024

(54) CONTACTLESS POWER FEEDING SYSTEM, POWER FEEDING DEVICE, AND POWER FEEDING MANAGEMENT SERVER

(71) Applicant: TOYOTA JIDOSHA KABUSHIKI KAISHA, Aichi-ken (JP)

(72) Inventors: Daiki Yokoyama, Gotemba (JP); Toshiya Hashimoto, Miyoshi (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/453,182

(22) Filed: Nov. 2, 2021

(65) Prior Publication Data

US 2022/0169130 A1    Jun. 2, 2022

(30) Foreign Application Priority Data

Dec. 2, 2020    (JP) ................. 2020-200472

(51) Int. Cl.
*H02J 50/40* (2016.01)
*B60L 53/12* (2019.01)
*B60L 53/60* (2019.01)
*B60L 58/12* (2019.01)
*H02J 50/80* (2016.01)

(52) U.S. Cl.
CPC ............. *B60L 53/12* (2019.02); *B60L 53/60* (2019.02); *B60L 58/12* (2019.02); *H02J 50/40* (2016.02); *H02J 50/80* (2016.02)

(58) Field of Classification Search
CPC .......... B60L 53/12; B60L 53/60; B60L 58/12; H02J 50/40; H02J 50/50; H02J 50/80
See application file for complete search history.

(56) References Cited

U.S. PATENT DOCUMENTS

| | | | | |
|---|---|---|---|---|
| 5,922,484 A | * | 7/1999 | Frazier | H01M 10/657 429/10 |
| 11,394,247 B1 | * | 7/2022 | Tsibulevskiy | H02J 50/40 |
| 2001/0039230 A1 | * | 11/2001 | Severinsky | B60W 20/30 180/65.23 |
| 2008/0164840 A1 | * | 7/2008 | Kato | H02J 50/60 336/200 |

(Continued)

FOREIGN PATENT DOCUMENTS

JP    2010167898 A    8/2010

*Primary Examiner* — Daniel Kessie
*Assistant Examiner* — Brian K Baxter
(74) *Attorney, Agent, or Firm* — HAUPTMAN HAM, LLP

(57) ABSTRACT

A contactless power feeding system includes: a power feeding device including a plurality of power feeding coils along a road, and configured to transmit electric power to a power receiving coil of an electric vehicle in a contactless manner; a receiver configured to receive traffic congestion information of the road; and an electronic control unit configured to: control transmission power transmitted from each of the plurality of power feeding coils to the power receiving coil, and control the power feeding device such that the transmission power of one or more power feeding coils located in a congestion occurrence section is higher than the transmission power of one or more power feeding coils located in a non-congestion occurrence section, wherein each of the congestion occurrence section and the non-congestion occurrence section are along a portion of the road including the plurality of power feeding coils.

11 Claims, 9 Drawing Sheets

(56) References Cited

U.S. PATENT DOCUMENTS

| | | | |
|---|---|---|---|
| 2010/0231163 A1* | 9/2010 | Mashinsky | B60L 7/12 |
| | | | 320/108 |
| 2011/0095604 A1* | 4/2011 | Bavard | B60M 3/06 |
| | | | 307/12 |
| 2012/0217111 A1* | 8/2012 | Boys | H02J 50/90 |
| | | | 191/10 |
| 2013/0214591 A1* | 8/2013 | Miller | B60L 53/12 |
| | | | 307/104 |
| 2014/0232197 A1* | 8/2014 | Keeling | B60L 53/305 |
| | | | 307/43 |
| 2015/0006032 A1* | 1/2015 | Jackson | B60W 50/0098 |
| | | | 701/41 |
| 2016/0072299 A1* | 3/2016 | Huang | H02J 7/0068 |
| | | | 307/104 |
| 2017/0207656 A1* | 7/2017 | Boys | B60L 53/122 |
| 2017/0334296 A1* | 11/2017 | Martin | H02J 7/025 |
| 2018/0134274 A1* | 5/2018 | Ogawa | B60W 10/06 |
| 2018/0229653 A1* | 8/2018 | Oh | B60K 35/00 |
| 2019/0381903 A1* | 12/2019 | Shin | B60L 15/20 |
| 2020/0269711 A1* | 8/2020 | VanDuyne | B60L 53/665 |
| 2020/0328623 A1* | 10/2020 | Kimball | H01Q 21/0025 |
| 2020/0393259 A1* | 12/2020 | Gantt, Jr. | B60L 53/65 |
| 2020/0398682 A1* | 12/2020 | Kimoto | B60L 53/12 |
| 2021/0203271 A1* | 7/2021 | Xu | H02S 40/36 |
| 2022/0388401 A1* | 12/2022 | Prüssmeier | B60L 53/305 |
| 2023/0369916 A1* | 11/2023 | Kim | H01F 38/14 |

\* cited by examiner

CONTACTLESS POWER FEEDING SYSTEM, POWER FEEDING DEVICE, AND POWER FEEDING MANAGEMENT SERVER

CROSS-REFERENCE TO RELATED APPLICATION

The present disclosure claims priority under 35 U.S.C. § 119 to Japanese Patent Application No. 2020-200472, filed on Dec. 2, 2020, the content of which is incorporated herein by reference in its entirety.

BACKGROUND

Technical Field

The present disclosure relates to a non-contact power feeding system, a power feeding device, and a power feeding management server that controls power transmitted to an electric vehicle in a non-contact manner.

Background

JP 2010-167898 A describes a hybrid vehicle including an internal combustion engine and an electric motor as a driving source. The hybrid vehicle includes a generator capable of generating power by the power of the internal combustion engine, a power storage device for storing electric power generated by the generator, and a controller. The controller charges the power storage device by operating the internal combustion engine and the generator when the SOC (State Of Charge) of the power storage device fall below a predetermined lower limit. Furthermore, the hybrid vehicle is provided with a power receiving device for receiving power transmitted in a non-contact manner from the power feeding device installed corresponding to a predetermined section of the road. Then, the controller is configured to start receiving power from the power feeding device when the hybrid vehicle enters the predetermined section, and to stop the internal combustion engine when the SOC is lower than the lower limit value described above.

SUMMARY

A road of the vehicle may include a power feeding section where a power feeding device is installed. Traffic congestion may occur along a traveling route of the power feeding section. When the starting and stopping of an electric vehicle is repeated due to congestion, the degree of reduction in SOC per unit distance increases, there is a possibility that electric power shortage occurs and the electric vehicle may not reach a destination. Therefore, assuming the occurrence of congestion, increasing the power transmitted from the power feeding device to the power receiving device of the vehicle side for all the power feeding devices installed in the power feeding section is conceivable. However, increasing the transmission power of all feeding devices regardless of the occurrence of congestion in order to efficiently manage the power consumption of the feeding device in the entire feeding section is not reasonable.

The present disclosure has been made in view of the problems as described above, and an object thereof is to provide a non-contact power feeding system, a power feeding device, and a power feeding management server that can efficiently manage the power consumption of the power feeding device in the entire power feeding section while suppressing the power shortage during congestion.

A contactless power feeding system according to at least one embodiment of the present disclosure includes: a power feeding device including a plurality of power feeding coils along a road along which an electric vehicle is able to travel, wherein the power feeding device is configured to transmit electric power to a power receiving coil of a power receiving device of the electric vehicle in a contactless manner; a receiver configured to receive traffic congestion information of the road; and an electronic control unit configured to: control transmission power transmitted from each of the plurality of power feeding coils to the power receiving coil, and control the power feeding device such that the transmission power of one or more power feeding coils of the plurality of power feeding coils located in a congestion occurrence section is higher than the transmission power of one or more power feeding coils of the plurality of power feeding coils located in a non-congestion occurrence section. Each of the congestion occurrence section and the non-congestion occurrence section are along a portion of the road including the plurality of power feeding coils.

The electronic control unit may be further configured to control the power feeding device to increase the transmission power as a time for the electric vehicle to pass through the congestion occurrence section increases.

The electronic control unit may be further configured to control the power feeding device such that the transmission power is lower when the electric vehicle traveling in a power feeding section has a power generation device, than when the electric vehicle traveling in the power feeding section does not have the power generation device. The power feeding section is along a portion of the road and includes the plurality of power feeding coils.

A power feeding device according to at least one embodiment of the present disclosure includes: a plurality of power feeding coils installed along a road which an electric vehicle is able to travel, wherein each of the plurality of power feeding coils is configured to transmit electric power to a power receiving coil of a power receiving device of the electric vehicle in a contactless manner; a receiver configured to receive traffic congestion information of the road; and an electronic control unit configured to: control transmission power transmitted from each of the plurality of power feeding coils to the power receiving coil, and control energization of the plurality of power feeding coils such that the transmission power of one or more power feeding coils of the plurality of power feeding coils located in a congestion occurrence section of the road is higher than the transmission power of one or more power feeding coils of the plurality of feed coils located in a non-congestion occurrence section of the road.

The electronic control unit may be further configured to control energization of the plurality of power feeding coils to increase the transmission power as a time for the electric vehicle to pass through the congestion occurrence section increases.

The electronic control unit may be further configured to control energization of the plurality of power feeding coils such that the transmission power is lower when the electric vehicle traveling in a power feeding section has a power generation device, than when the electric vehicle traveling in the power feeding section does not have the power generation device. The power feeding section is along a portion of the road and includes the plurality of power feeding coils.

A power feeding management server according to at least one embodiment of the present disclosure includes: a receiver configured to receive traffic congestion information of a road along which a plurality of power feeding coils are installed; and an electronic control unit configured to: control transmission power transmitted from each of the plurality of power feeding coils to a power receiving coil of an electric vehicle, and control energization of the plurality of power feeding coils such that the transmission power of one or more power feeding coils of the plurality of power feeding coils located in a congestion occurrence section of the road is higher than the transmission power of one or more power feeding coils of the plurality of power feeding coils located in a non-congestion occurrence section of the road.

The electronic control unit may be further configured to control energization of the plurality of power feeding coils to increase the transmission power as a time for the electric vehicle to pass through the congestion occurrence section increases.

The electronic control unit may be further configured to control energization of the plurality of power feeding coils such that the transmission power is lower when the electric vehicle traveling in a power feeding section has a power generation device, than when the electric vehicle traveling in the power feeding section does not have the power generation device. The power feeding section is along a portion of the road and includes the plurality of power feeding coils.

According to each of the non-contact power feeding system, the power feeding device, and the power feeding management server according to embodiments of the present disclosure, the transmission power of the power feeding coil located within the congestion occurrence section is increased as compared with the transmission power of the power feeding coil located within the non-congestion occurrence section. Thus, as compared with the example of increasing the transmission power of all the power feeding device regardless of the presence or absence of congestion, efficiently managing the power consumption of the power feeding device in the entire power feeding section while suppressing the power failure in the congestion is possible.

DETAILED DESCRIPTION

Figure 1:
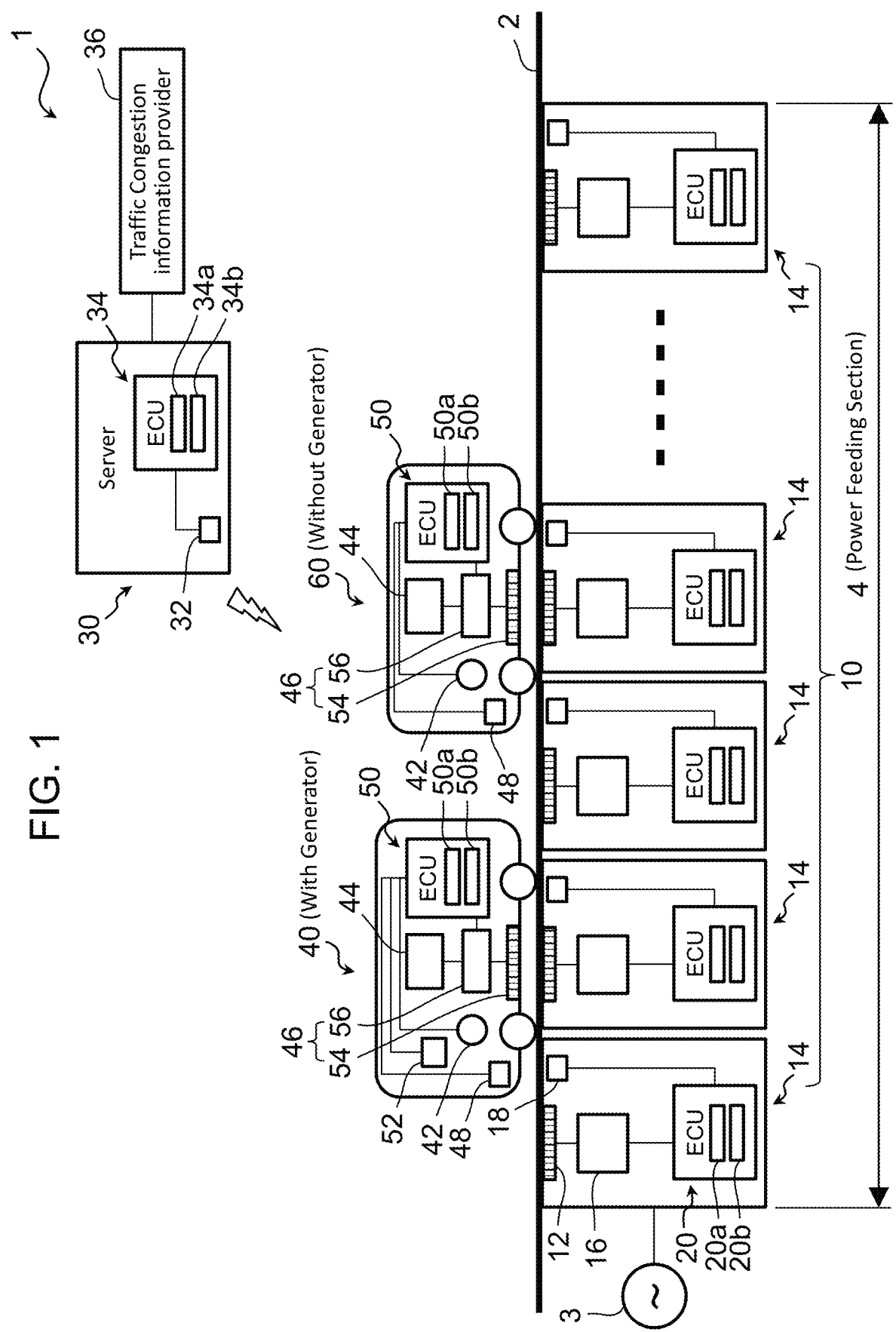
FIG. 1 is a schematic diagram of a configuration of a non-contact power feeding system according to at least one embodiment of the present disclosure.

In the following embodiments of the present invention, the same components in the drawings are denoted by the same reference numerals, and redundant descriptions thereof are omitted or simplified. Moreover, it is to be understood that even when the number, quantity, amount, range or other numerical attribute of an element is mentioned in the following description of the embodiments, the present invention is not limited to the mentioned numerical attribute unless explicitly described otherwise, or unless the present invention is explicitly specified by the numerical attribute theoretically. Furthermore, structures or steps or the like that are described in conjunction with the following embodiments are not necessarily essential to the present invention unless explicitly shown otherwise, or unless the present invention is explicitly specified by the structures, steps or the like theoretically.

1-1. Configuration Example of Non-contact Power Feeding System

FIG. 1 is a schematic diagram of a configuration of a non-contact power feeding system 1 according to at least one embodiment. The non-contact power feeding system 1 is configured to transmit (supply) power to the electric vehicle traveling or stopping on the road 2.

1-1-1. Power Feeding Device

The non-contact power feeding system 1 includes a power feeding device 10. Electric power is supplied to the power feeding device 10 from the AC (alternating current) power source (external power supply) 3. The power feeding device 10 includes a plurality of power feeding coils 12 which are installed so as to be aligned along the road 2. As shown in FIG. 1, a section in which a plurality of power feeding coils 12 is installed in the road 2 is identified as a power feeding section 4.

The power feeding device 10, for example, is configured to transmit power in a non-contact manner from the power feeding coil 12 by utilizing a magnetic field resonance method to the power receiving coil 54 to be described later of the electric vehicle side. A plurality of power feeding coils 12 are installed near the road surface of the traveling road 2 as shown in FIG. 1. However, as long as the plurality of power feeding coils 12 are installed along the road 2, the power feeding coils may be installed along the road above or to the side of the electric vehicle instead of the example shown in FIG. 1. Further, in order to transmit power in a non-contact manner, instead of the magnetic field resonance method, for example, an electromagnetic induction method may be used.

In the example shown in FIG. 1, each of the plurality of power feeding coils 12 is included in the power feeding unit 14. Power feeding unit 14, together with the power feeding coil 12, and a power feeding circuit 16 and the communication device 18 and the electronic control unit (ECU) 20. The power feeding circuit 16 includes an inverter. Based on a command from ECU 20, the power feeding circuit 16 controls the energization of the power feeding coil 12. More particularly, the power feeding circuit 16 controls the transmission power P that is the power transmitted from the power feeding coil 12 to the power receiving coil 54.

The communication device 18 communicates with the communication device 32 of the server 30, which will be described later, via a wireless communication network such as 4G or 5G, and communicates with the communication device 48 of the electric vehicles 40 and 60 using, for example, short-range wireless communication.

ECU 20 controls the transmission power P by controlling the feed circuit 16. Specifically, ECU 20 includes a processor 20a and a storage device 20b. The storage device 20b stores a program for controlling the power feeding circuit 16. The processor 20a reads and executes a program stored in the storage device 20b. Thereby, various processes by the processor 20a relating to control of the transmission power P, which will be described later, are realized.

1-1-2. Server

The contactless power feeding system 1 further includes a server (remote server) 30. In the example of the non-contact power feeding system 1, the server 30 transmits information used for controlling the transmission power P in the power feeding device 10 to the power feeding device 10. Specifically, the server 30 includes a communication device 32 and an ECU 34. The communication device 32 can communicate not only with the communication device 18 but also with the traffic congestion information provider 36 via a wireless communication network such as a 4G or 5G.

ECU 34 includes a processor 34a and a storage device 34b. The processor 34a reads and executes a program stored in the storage device 34b. Thus, various processing by the processor 34a is realized.

In at least one embodiment, ECU 34 of the server 30 receives the traffic congestion information on the power feeding section 4 of the travel route 2 by using the communication device 32. Therefore, in at least one embodiment, the communication device 32 corresponds to an example of the "reception device" according to at least one embodiment of the present disclosure. Further, as will be described in detail later, ECU 34, together with ECU 20 of the power feeding device 10 side, executes a process relating to the control of the transmission power P.

1-1-3. Electric Vehicle

An example of an electric vehicle in which a non-contact power feeding system 1 is available is shown in FIG. 1. Here, an electric vehicle receiving power from the power feeding device 10 is distinguished between an electric vehicle 40 having a power generation device 52 and an electric vehicle 60 having no power generation device 52.

Electric vehicle 40, together with the electric motor 42 for traveling and the power storage device 44, and a power receiving device 46 and the communication device 48 and the vehicle ECU 50 and the power generation device 52. Power receiving device 46 includes a power receiving coil 54 for receiving power transmitted from the power feeding coil 12, and a power receiving circuit 56. Power receiving circuit 56 includes a rectifier that converts the exchange power received by the power receiving coils 54 to a direct current. The power storage device 44 is, for example, a lithium ion battery, and is connected to the power receiving circuit 56 and the power generation device 52. The power storage device 44 is charged by the power supplied from the power feeding device 10 via the power receiving device 46.

Communication device 48, as described above, communicates with the communication device 18 of each power feeding unit 14.

Vehicle ECU 50 performs various vehicle control. Specifically, the vehicle ECU 50 performs control of the electric motor 42 for running. The vehicle ECU 50 also controls the power received from the power feeding device 10 by controlling the power receiving circuit 56. Further, in the electric vehicle 40 including the power generation device 52, the vehicle ECU 50 also performs control related to power generation using the power generation device 52. The vehicle ECU 50 includes a processor 50a and a storage device 50b. The processor 50a reads and executes a program stored in the storage device 50b. As a result, various processes by the processor 50a relating to various vehicle controls are realized.

The power generator 52 is, for example, a combination of an internal combustion engine and a generator for generating power using the power of the internal combustion engine. That is, an example of an electric vehicle 40 is a hybrid electric vehicle. Another example of the power generator 52 is a fuel cell. That is, another example of an electric vehicle 40 is a fuel cell electric vehicle. The power storage device 44 is connected to the power generation device 52. Therefore, in the electric vehicle 40, charging the power storage device 44 by utilizing the power generated by the power generator 52 is also possible.

The electric vehicle 60 does not have a power generation device 52, but includes an electric motor 42, a power storage device 44, a power receiving device 46, a communication device 48 and a vehicle ECU 50 similar to the electric vehicle 40. Electric vehicle 60 is, for example, a battery electric vehicle. Another example of electric vehicle 60 is a small robotic vehicle (micro pallet) that is autonomous and capable of carrying people or luggage.

1-2. Control of Transmission Power P Considering Congestion Information

In the control of the transmission power P in at least one embodiment, the congestion occurrence section included in the power feeding section 4 of the road 2 is specified based on the congestion information. Then, the transmission power P to the electric vehicle 40, 60 from the respective power feeding coils 12 located in the congestion generation section, so as to be higher than the transmission power P in the non-congestion generation section included in the power feeding section 4, the power feeding device 10 (each power feeding unit 14) is controlled. In at least one embodiment, the control of the transmission power P is executed by ECU 20 incorporated in each power feeding unit 14 and ECU 34 of the server 30.

Figure 2:
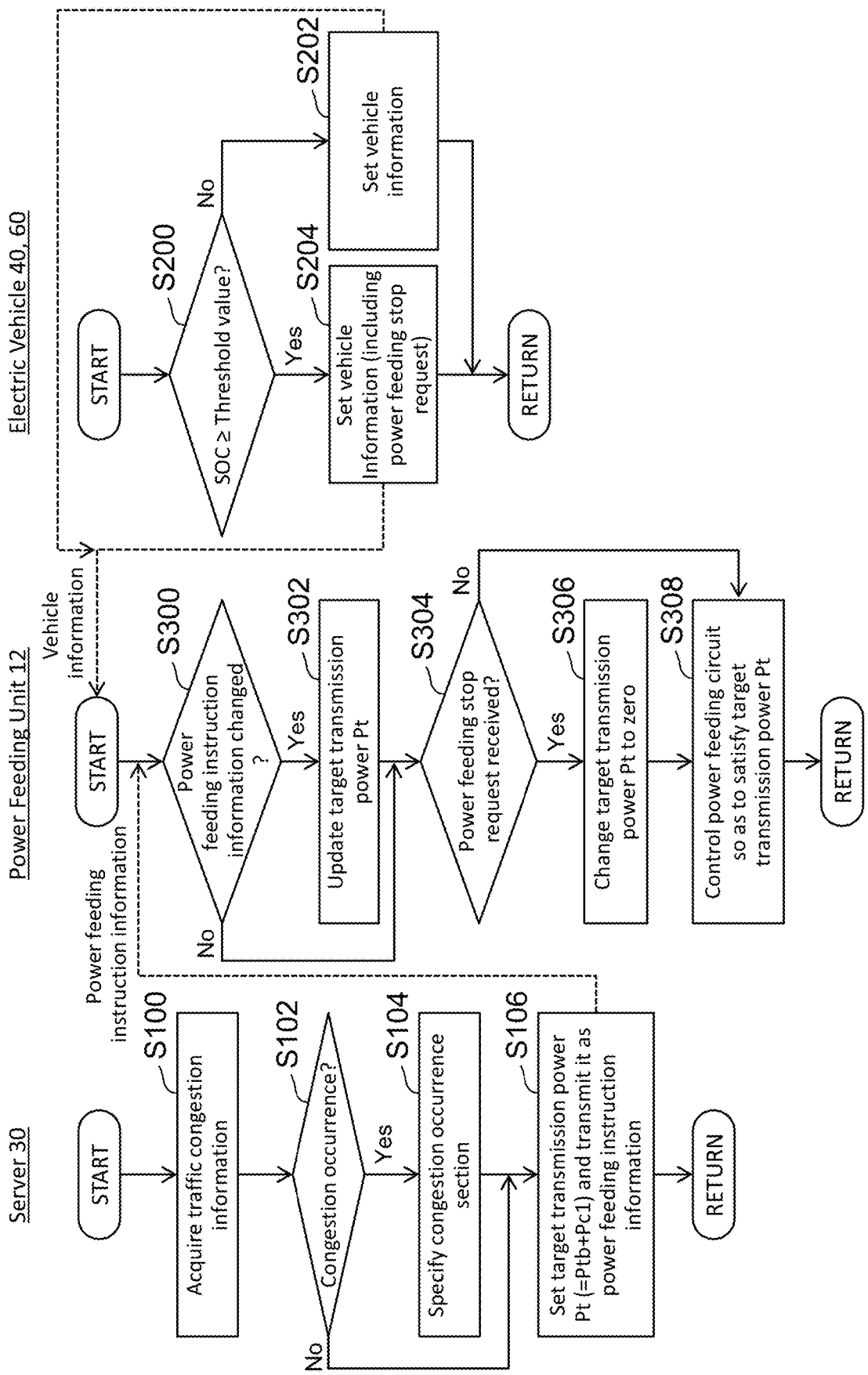
FIG. 2 is a flowchart of a flow of processing relating to the control of the transmission power P according to at least one embodiment of the present disclosure.

FIG. 2 is a flowchart of a process flow relating to the control of the transmission power P according to at least one embodiment. In FIG. 2, the processing relating to the server 30 is repeatedly executed at predetermined time intervals. Therefore, the traffic congestion information, which will be described later, acquired by the server 30 is updated over time. The processing relating to the electric vehicles 40 and 60 is repeatedly executed for each vehicle. The processing relating to the power feeding unit 14 is repeatedly executed for each power feeding unit 14, and is started each time vehicle information is received.

First, a process related to the server 30 will be described. In the step S100, ECU 34 (processor 34a) acquires traffic congestion information from the traffic congestion information provider 36 using the communication device 32. More specifically, ECU 34 acquires, for example, traffic congestion information of respective points in the power feeding section 4. Thereafter, the process proceeds to step S102.

In the step S102, ECU 34 determines whether or not congestion has occurred in the power feeding section 4 based on the acquired congestion information. As a result, if traffic congestion has occurred, the process proceeds to step S104. On the other hand, when the traffic congestion does not occur, the process proceeds to step S106.

In the step S104, ECU 34 specifies the congestion occurrence section included in the power feeding section 4 based on the acquired congestion information, and then specifies the power feeding unit 14 located within the congestion occurrence section. Thereafter, the process proceeds to step S106.

In the step S106, ECU 34 transmits the target transmission power Pt to the respective power feeding units 14 as the power feeding instruction information. Here, in at least one embodiment, the value (=Ptb+Pc1) obtained by adding the power correction amount Pc1 to the base value Ptb is used as the target transmission power Pt. As the base value Ptb, for example, a predetermined value is used.

The power correction amount Pc1 is changed according to whether the power feeding unit 14 is located in the congestion occurrence section or in the non-congestion occurrence section. Specifically, for the power feeding unit 14 located in the congestion generating section, a positive predetermined value a is used as the power correction amount Pc1. On the other hand, for the power feeding unit 14 located in the non-congestion generation section, the power correction amount Pe1 is zero.

Therefore, according to the process of the present step S106, the power feeding unit 14 located in the congestion generation section, the target transmission power Pt predetermined value a is added to the base value Ptb is transmitted as the power feeding instruction information. On the other hand, the power feeding unit 14 located in the non-congestion occurrence section, the target transmission power Pt equal to the base value Ptb is transmitted as the power feeding instruction information.

Next, processing relating to the electric vehicles 40 and 60 will be described. In step S200, the vehicle ECU 50 (processor 50a) determines whether or not the SOCs (State Of Charge) of the power storage devices 44 are equal to or larger than predetermined thresholds. That is, a determination is made whether or not power feeding from the power feeding apparatus 10 is desired. For example, SOC can be calculated based on the voltage and current of the power storage device 44 detected using a voltage sensor and a current sensor which are not shown.

If the SOCs are less than the thresholds in step S200, i.e., if power is desired, the process proceeds to step S202. One example of wireless communication between the communication device 48 on the vehicle-side and the communication device 18 on the power feeding unit 14 side is a short-range wireless communication utilizing a RFID (radio frequency Identification) technique. The communication device 48 on the vehicle side includes an IC tag in which rewritable vehicle information is embedded. Communication device 18 of the power feeding unit 14 side includes a reader for reading the IC tag by radiating the carrier wave to the surroundings. In this step S202, the vehicle ECU 50 sets information indicating that the electric vehicle 40 or 60 is the power-fed target vehicle as the vehicle information to be embedded in the IC-tag.

On the other hand, if the SOC is equal to or greater than the threshold value in the step S200, that is, if the power feeding is not desired, the process proceeds to step S204. In the step S204, the vehicle ECU 50 sets information indicating a power feeding stop request together with information indicating that the electric vehicle 40 or 60 is a power feeding target vehicle as the vehicle information to be embedded in the IC tag.

Next, the processing related to the power feeding unit 14 will be described. When the electric vehicle 40 or 60 (the communication device 48) approaches a close distance with respect to the power feeding unit 14 (the communication device 18), the communication device 18 receives vehicle information from the electric vehicle 40 or 60 which is a power feeding object. The power feeding unit 14 (ECU 20) can detect the approach of the electric vehicle 40 or 60 to the power feeding unit 14 by utilizing the communication of such vehicle information. Then, with the reception of the vehicle information, the processing relating to the power feeding unit 14 object the electric vehicle 40 or 60 that has transmitted the vehicle information is started.

In step S300, ECU 20 (processor 20a) determines whether or not the power feeding instruction information (target transmission power Pt) transmitted from the server 30 has been changed from the stored value (see step S302). The power feeding instruction information is changed according to the occurrence or elimination of congestion at the point where the power feeding unit 14 to be transmitted is installed.

If there is a change in the power feeding instruction information in step 300, the process proceeds to step S302. In the step S302, ECU 20 updates the target transmission power Pt according to the changed power feeding instruction information. Therefore, when the installation point of the power feeding unit 14 is to be included in the congestion generation section due to the occurrence of congestion, the target transmission power Pt is changed from the base value Ptb to the target transmission power Pt for congestion generation (=Ptb+α). In this S302, ECU 20 stores, as the stored value, the updated target transmission power Pt in the storage device 20b. Thereafter, the process proceeds to step S304.

On the other hand, if the power feeding instruction information is not changed in step S300, the process proceeds to step S304 without updating the target transmission power Pt.

In step S304, ECU 20 determines whether or not ECU 20 has received a power feeding stop request (i.e., whether or not the received vehicle information includes information indicating the power feeding stop request). Consequently, if a power feeding stop request is received, the process proceeds to step S306 and ECU 20 changes the target transmission power Pt to zero. Thereafter, the process proceeds to step S308. In addition, if no power feeding stop request is received in step S304, the process proceeds to step S308 without changing the target transmission power Pt from the most recently updated value in step S302.

In the step S308, ECU 20 controls the feed circuitry 16 so that a transmission power P of a magnitude satisfying the target transmission power Pt is obtained. In addition, if the target transmission power Pt is changed to zero at the step S306, power is not supplied from the power feeding unit 14 that has processed the step S306 to the electric vehicle 40 or 60 that has transmitted the power feeding stop request. On the other hand, if the target transmission power Pt is not zero is used, when the power receiving coil 54 of the electric vehicle 40 or 60 of the power feeding target approaches the power feeding coil 12, the transmission of power corresponding to the target transmission power Pt is performed.

1-3. Effect

According to the processing of the flowchart shown in FIG. 2 described above, the target transmission power Pt used in the congestion occurrence section is increased as compared with the target transmission power Pt used in the non-congestion occurrence section. As a result, the transmission power P of the power feeding coil 12 (power feeding unit 14) located in the congestion generating section, can be increased as compared with the transmission power P of the power feeding coil 12 located in the non-congestion generating section. Thus, as compared with the example of increasing the transmission power P of all the power feeding device 10 of the power feeding section 4 regardless of the presence or absence of congestion occurrence, the power consumption of the power feeding device 10 in the entire power feeding section 4 while suppressing the power shortage during congestion can be efficiently managed.

1-4. Other Setting Example of Target Transmission Power Pt

1-4-1. Setting Example of Target Transmission Power Pt Considering Time to Pass through Traffic Congestion In this example, the target transmission power Pt used in the congestion occurrence section is determined in consideration of not only the presence or absence of the congestion occurrence but also the time T for the electric vehicle 40 or 60 to pass through the congestion occurrence section. Specifically, when the time T is long, the target transmission power Pt is determined so as to be higher than when the time T is short.

Figure 3:
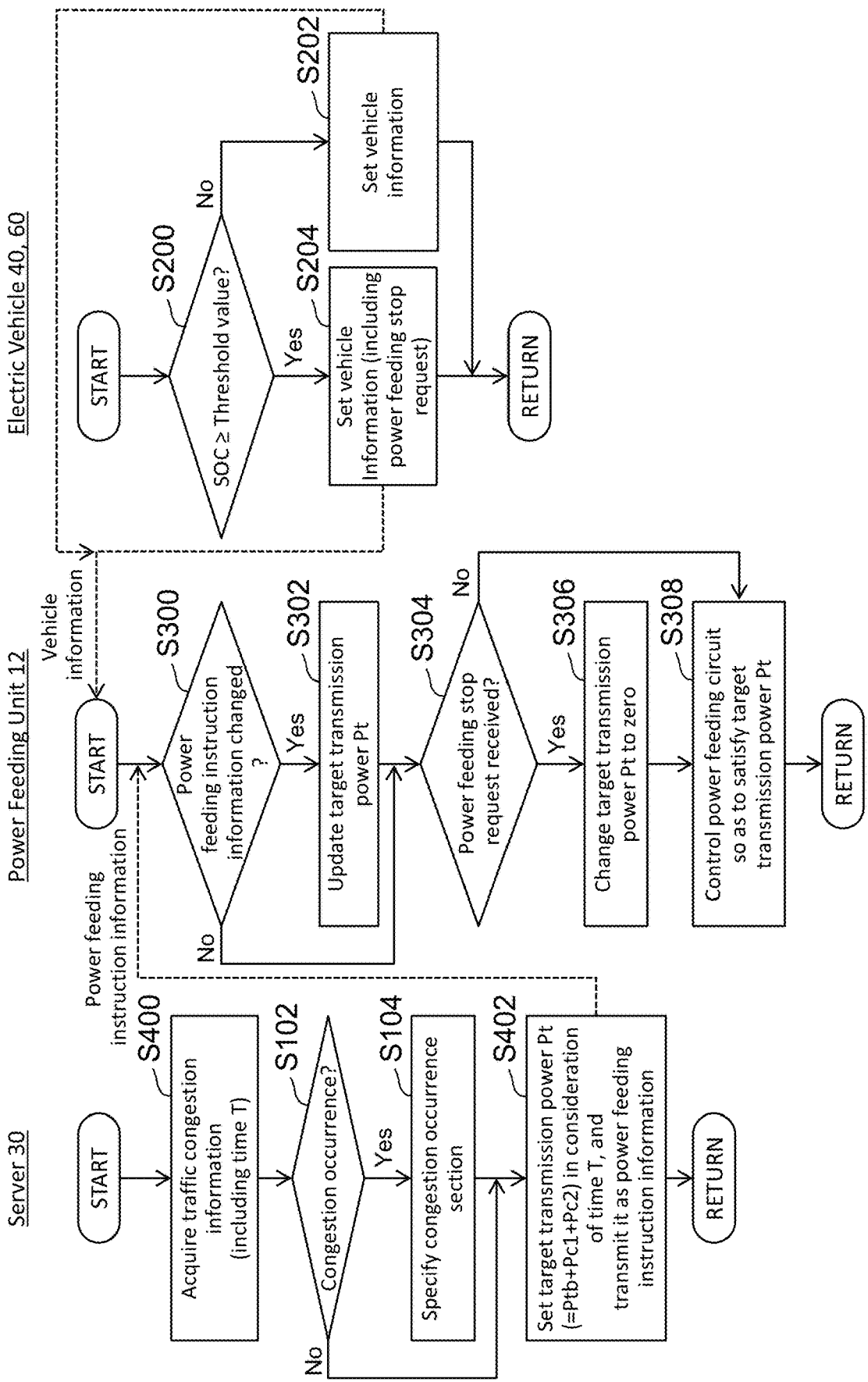
FIG. 3 is a flowchart of a flow of processing relating to the control of the transmission power P according to at least one embodiment of the present disclosure.

FIG. 3 is a flowchart of a flow of processing relating to the control of the transmission power P according to at least one embodiment. The processing of this flowchart differs from the processing of the flowchart shown in FIG. 2 in a part of the processing relating to the server 30 described below.

In the process related to the server 30, ECU 34 first acquires traffic congestion information in the step S400. The traffic congestion information acquired from the traffic congestion information providers 36 in this step S400 includes the traffic congestion information (see step S100) of the respective points in the power feeding section 4 as well as the predicted information (predicted values) of the time T. Thereafter, the process proceeds to step S102.

Further, in FIG. 3, in the step S402 following the step S104, ECU 34 transmits the target transmission power Pt to the respective power feeding unit 14 as the power feeding instruction information. The target transmission power Pt used in this step S402 is a value (=Ptb+Pc1+Pc2) obtained by adding the following power correction amount Pc2 to the base value Ptb together with the power correction amount Pc1 (refer to step S106).

The power correction value Pc2 is changed according to the time T. Specifically, with respect to the power feeding unit 14 located within the congestion generation section, the power correction amount Pc2 (positive value), when the time T is long, a determination is made in advance so as to be larger than when the time T is short. More specifically, the power correction amount Pc2 is determined so that, for example, the longer the time Tis, the larger the power correction amount is continuously (straight line or curvilinearly). Further, the power correction amount Pc2 may be determined such that the longer the time T is, the larger the power correction amount Pc2 is stepwise in the number of stages of two or more stages. On the other hand, for the power feeding unit 14 located in the non-congestion generation section, the power correction amount Pc2 is zero.

Therefore, according to the process of step S402, the target transmission power Pt obtained by adding the power correction amount Pc1 and Pc2 to the base value Ptb is transmitted as the power feeding instruction information to the power feeding unit 14 located in the congestion generation section. On the other hand, the power feeding unit 14 located in the non-congestion occurrence section, the target transmission power Pt equal to the base value Ptb is transmitted as the power feeding instruction information.

If the time T for the traffic congestion passage becomes long, the SOC may be greatly lowered. With respect to this additional problem, according to the processing of the flowchart shown in FIG. 3 described above, the target transmission power Pt used in the congestion occurrence section is determined so that when the time T is long, the target transmission power PT is larger than when the time T is short. As a result, the transmission power P of the power feeding coil 12 located in the congestion generation section (power feeding unit 14) is controlled so as to be larger when the time Tis long as compared with when the time T is short. Thus, as compared with the example of supplying (transmission) uniform power to the electric vehicle 40, 60 regardless of the time T, efficiently managing the power consumption of the power feeding devices 10 in the entire power feeding section 4 while suppressing more effectively the power shortage during congestion in consideration of the time T is possible.

Other Acquisition Examples of Time T

In the step S400 described above, as the time T, the predicted value provided by the traffic congestion information provider 36 is used. Instead of such an example, the time T may be acquired by, for example, the following method. That is, the time T for passing through a certain traffic congestion occurrence section is basically proportional to the traffic congestion occurrence time in the traffic congestion occurrence section. Therefore, the time T calculated so as to become longer as the congestion occurrence time becomes longer may be used. More specifically, the congestion occurrence time referred to herein may be, for example, a predicted value provided from the congestion information provider 36, or may be, for example, a duration of a congestion actually occurring when the electric vehicles 40 and 60 actually enter the congestion occurrence section.

1-4-2. Setting Example of Target Transmission Power Pt Considering Type of Electric Vehicle In this example, the target transmission power Pt used in the congestion occurrence section is changed according to whether the electric vehicle to be fed has a power generation device. Specifically, the target transmission power Pt of the electric vehicle 40 having the power generation device 52 is determined to be lower than that of the electric vehicle 60 having no power generation device 52.

Figure 4:
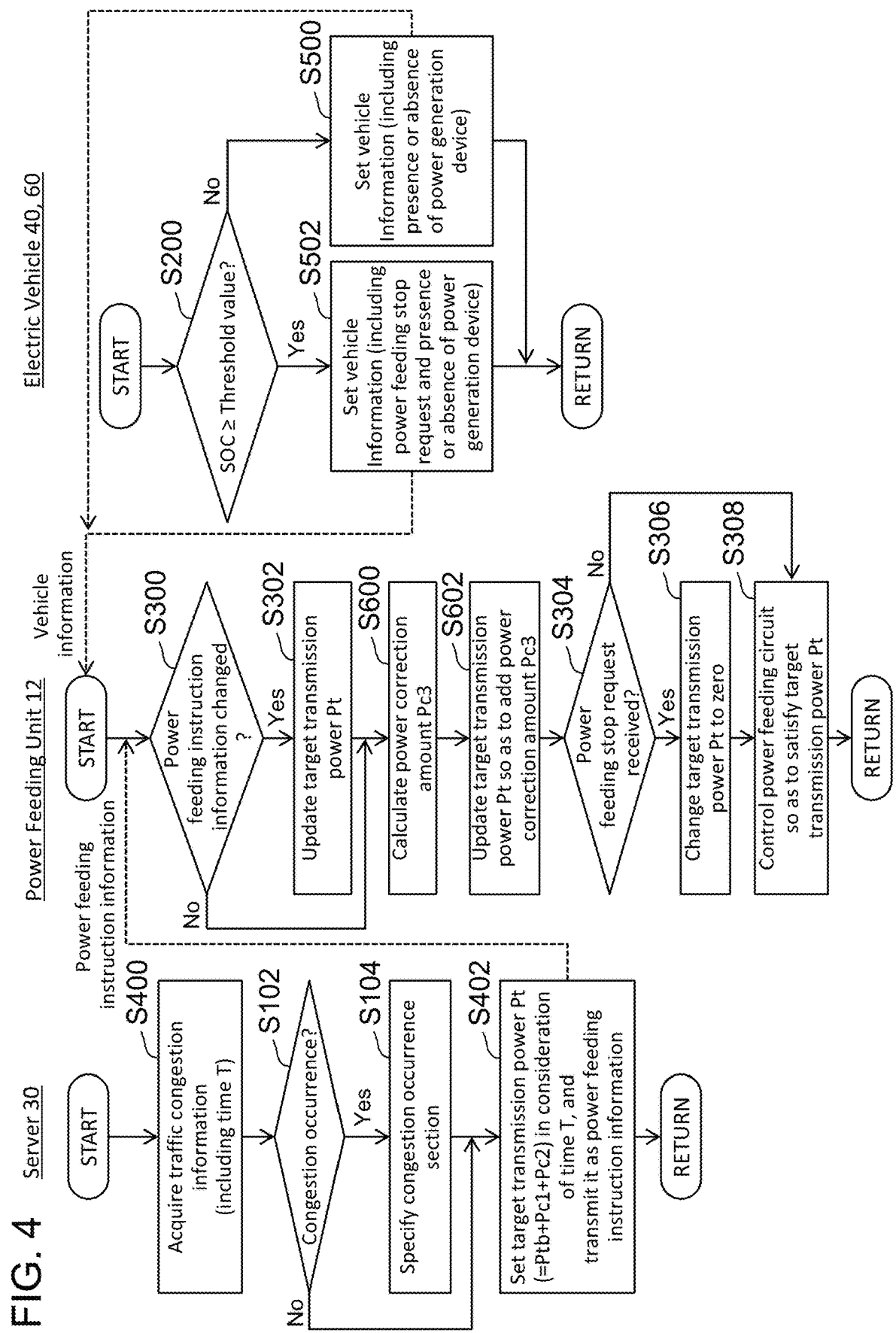
FIG. 4 is a flowchart of a flow of processing relating to the control of the transmission power P according to at least one embodiment of the present disclosure.

FIG. 4 is a flowchart of a flow of processing relating to the control of the transmission power P according to at least one embodiment. The processing of this flowchart differs from the processing of the flowchart shown in FIG. 3 in a part of processes for each of the power feeding units 14 and the electric vehicles 40, 60 described below.

In the process for electric vehicles 40, 60 in FIG. 4, if the SOCs are less than thresholds (i.e., power feeding is required) at step S200, the process proceeds to step S500. In the step S500, the vehicle ECU 50 sets, as the vehicle information embedded in the IC tag, information indicating the presence or absence of the power generation device 52 together with information indicating that the electric vehicle 40 or 60 is a power feeding target vehicle.

On the other hand, in response to a determination in step S200 that the SOCs are equal to or larger than the thresholds (i.e., power feeding is not required), the process proceeds to step S502. In the step S502, the vehicle ECU 50 sets, as the vehicle information embedded in the IC tag, the information indicating the power feeding stop request together with the information indicating whether or not the electric vehicle 40 or 60 is the power feeding target vehicle and the information indicating whether or not the power generation device 52 is present.

Further, the processing relating to the power feeding unit 14 in FIG. 4 is different from the processing in FIG. 3 in that the step S600 and S602 are added between the step S302 and the step S304. In step S600, ECU 20 calculates a power correction amount Pc3. This power correction amount Pc3 is changed according to the presence or absence of the power generation device 52.

Specifically, when the vehicle passing through the power feeding unit 14 is an electric vehicle 40 having a power generation device 52, the power correction amount Pc3 is, for example, zero. On the other hand, when the vehicle passing through the power feeding unit 14 is an electric vehicle 60 having no power generator 52, for example, a positive predetermined value B is used as the power correction amount Pc3. Thereafter, the process proceeds to step S602. Incidentally, the power correction amount Pc3 used in the electric vehicle 40 having the power generation device 52 may be changed according to the capacity of the power generation device (the size of the power that can be generated). Specifically, the power correction amount Pc3 used for the electric vehicle 40 may be set to, for example, be closer to zero as the capacity of the power generation device is higher, and closer to the predetermined value B as the capacity of the power generation device is lower.

In the step S602, ECU 20 updates the target transmission power Pt by a value (=Ptb+Pc1+Pc2+Pc3) obtained by additionally adding the power correction amount Pc3 calculated in the step S600 to the target transmission power Pt (see step S402) included in the power feeding instruction information from the server 30. As a result, the target transmission power Pt of the electric vehicle 40 having the power generation device 52 is lower than that of the electric vehicle 60 having no power generation device 52.

In the electric vehicle 40 having a power generation device 52, even if the SOC is greatly reduced, generating power spontaneously is possible. Therefore, avoiding electric power shortage is possible. On the other hand, in the electric vehicle 60 having no power generation device 52, when SOC is greatly reduced, electric power shortage is more likely.

With respect to the additional challenges described above, according to the processing of the flowchart shown in FIG. 4, the target transmission power Pt used for the electric vehicle 40 having the power generation device 52 is lower than that used for the electric vehicle 60 having no power generation device 52. As a result, the transmission power P to the electric vehicle 40 is lower than the transmission power P to the electric vehicle 60. Thus, as compared with an example of supplying (transmitting) uniform power to the electric vehicle 40, 60 regardless of the presence or absence of the power generator 52, efficiently supplying a large amount of power to the electric vehicle 60 having no power generator 52 for power shortage avoidance while reducing the total value of the power supplied to both the electric vehicle 40, 60 is possible.

Other Setting Example of Target Transmission Power Pt

In the process of the step S600 shown in FIG. 4, the power correction amount Pc3 used for the electric vehicle 40 having the power generation device 52 is determined to be smaller than that used for the electric vehicle 60 having no power generation device 52, regardless of whether the congestion occurrence section is the congestion occurrence section or the non-congestion occurrence section. Instead of such an example, the change of the target transmission power Pt according to the presence or absence of the power generator 52 may be performed only for the congestion generation section. Specifically, when the vehicle passing through the power feeding unit 14 located within the congestion generating section is electric vehicle 40 having a power generation device 52, the power correction amount Pc3 may be zero. If the vehicle passing through the power feeding unit 14 is electric vehicle 60 that does not have a power generation device 52, a positive predetermined value B may be used as the power correction amount Pc3. Then, for the power feeding unit 14 located within the non-congestion generation section, the power correction amount Pc3 may be set to be zero regardless of the presence or absence of the power generation device 52.

The processing relating to the server 30 in the flow chart shown in FIG. 4 is the same as that shown in FIG. 3, but instead of this, the processing relating to the server 30 shown in FIG. 2 without using the power correction amount Pc2 may be combined. That is, as the target transmission power Pt that is finally commanded to the power feeding circuit 16, a value (=Ptb+Pc1+Pc3) obtained by adding the power correction amount Pc3 (refer to step S600) together with the power correction amount Pc1 (see step S106) to the base value Ptb may be used.

2. Additional Example

In the example shown in FIGS. 2 and 3 in at least one embodiment described above, the server 30 determines the target transmission power Pt. Further, in the example shown in FIG. 4, the target transmission power Pt determined by the server 30 is modified by the power feeding unit 14 (power feeding device 10) (refer to S602 of steps). In contrast, in at least one embodiment, the power feeding device 70 shown in FIG. 5 below determines the target transmission power Pt.

2-1. Configuration Example of Power Feeding Device

Figure 5:
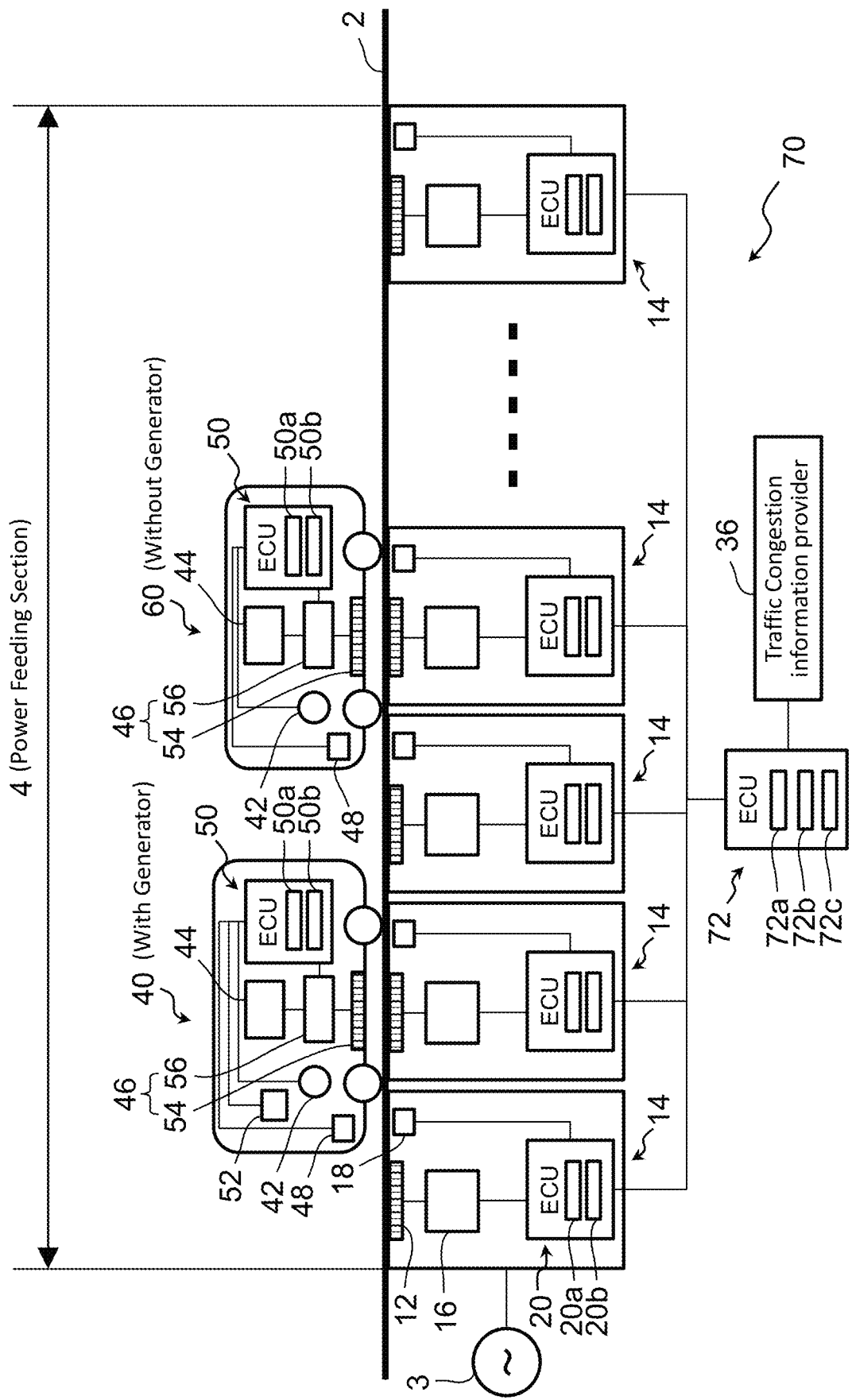
FIG. 5 is a schematic diagram of a configuration of the power feeding device according to at least one embodiment of the present disclosure.

FIG. 5 is a schematic diagram of a configuration of a power feeding device 70 according to at least one embodiment. The power feeding device 70 includes an ECU 72 that collectively controls the power feeding device 70. The ECU 72 transmits (commands) the power feeding instruction information (target transmission power Pt) to ECU 20 included in the power feeding unit 14 installed in the power feeding section 4.

Specifically, the ECU 72 includes a processor 72a, a storage device 72b, and a communication device 72c. The processor 72a reads and executes a program stored in the storage device 72b. Thus, various processing by the processor 72a is realized. The ECU 72 is connected to the respective ECU 20 via a wire, for example. However, the ECU 72 may perform radio communication with the respective ECU 20.

The communication device 72c can communicate with the traffic congestion information provider 36 via a wireless communication network, such as a 4G or 5G. Unlike FIG. 1, the configuration shown in FIG. 5 does not include the server 30. Instead of the server 30, the ECU 72 uses the communication device 72c to directly obtain traffic congestion information. However, in the case of the power feeding device 70 including the ECU 72, the ECU 72 may acquire the traffic congestion information via a server such as the server 30.

In addition, the server 30 (see FIG. 1) is typically installed on a district-by-district or town-by-town unit. In other words, the server 30 is typically installed so as to cover a plurality of power feeding sections 4. In contrast, the ECU 72 is typically installed to cover one power feeding section 4, as shown in FIG. 5. As described above, the ECU 72 is to be installed in a narrower area than the server 30.

2-2. Control of Transmission Power P Considering Congestion Information

Figure 6:
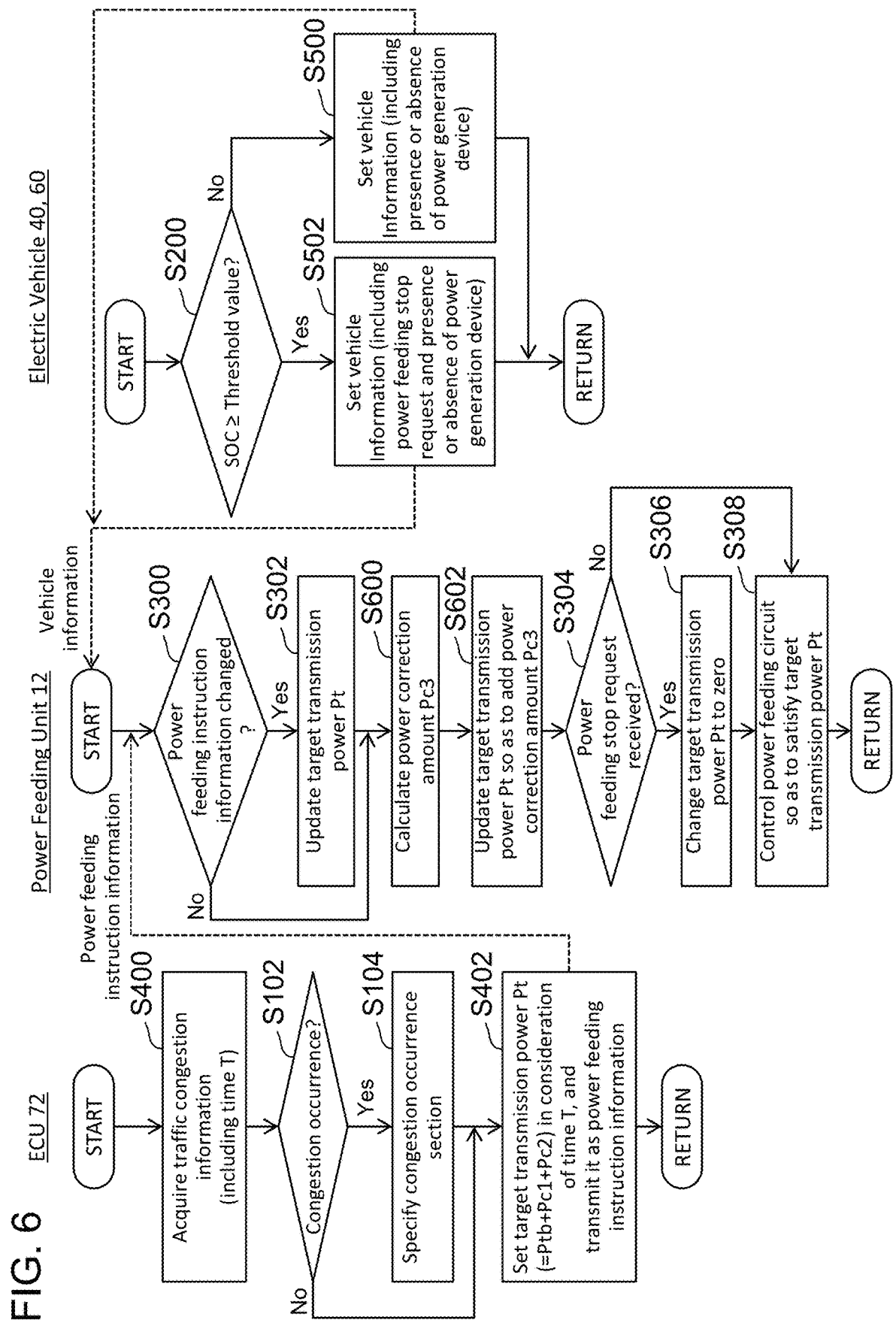
FIG. 6 is a flowchart of a flow of processing relating to the control of the transmission power P according to at least one embodiment of the present disclosure.

FIG. 6 is a flowchart of a process flow relating to the control of the transmission power P according to at least one embodiment. The processing of this flowchart is the same as the processing of the flowchart shown in FIG. 4, except that the processing related to the server 30 shown in FIG. 4 is performed by the ECU 72. Therefore, a detailed description thereof is omitted.

2-3. Effect

According to the processing of the flowchart shown in FIG. 6 described above, the control of the transmission power P considering the traffic congestion information is performed by the ECU 72 and the individual ECU 20. In at least one embodiment in which the transmission power P is controlled in this manner also has the same effect as the first embodiment.

2-4. Setting Examples of Other Target Transmission Power Pt

According to the process shown in FIG. 6 described above, for determining the target transmission power Pt, the power correction amounts Pc1, Pc2 and Pc3 is used. Alternatively, the ECU 72 and ECU 20 may perform the same processing of the example other than the example shown in FIG. 4 in at least one embodiment, whereby only the power correction amount Pc1, power correction amounts Pc1 and Pc2, or power correction amounts Pc1 and Pc3 may be used in order to determine the target transmission power Pt.

Further, the calculation of the target transmission power Pt utilizing the power correction amount Pc3 in FIG. 6 (step S600 and S602) may be executed by the ECU 72 instead of ECU 20. Furthermore, in the example of the power feeding device without the ECU 72, the ECU 20 of each power feeding unit 14 may acquire the congestion information and perform all processes related to the determination of the target transmission power Pt.

3. Additional Example

In at least one embodiment, an example in which the server 30 mainly performs control of the transmission power P will be described. Specifically, an example in which the server 30 determines the target transmission power Pt using the power correction amount Pc1 and an example in which the server 30 determines the target transmission power Pt using the power correction amount Pc1 and Pc2 are as described with reference to FIGS. 2 and 3 in at least one embodiment, respectively. In at least one embodiment, an example is described in which the servers 30 determine the target transmission power Pt using the power correction amount Pc3 together with only the power correction amount Pc1 or the power correction amount Pc1 and Pc2. The server 30 that mainly performs control of the transmission power P corresponds to an example of the "power feeding management server" according to at least one embodiment of the present disclosure.

3-1. Control of Transmission Power P Considering Congestion Information

Figure 7:
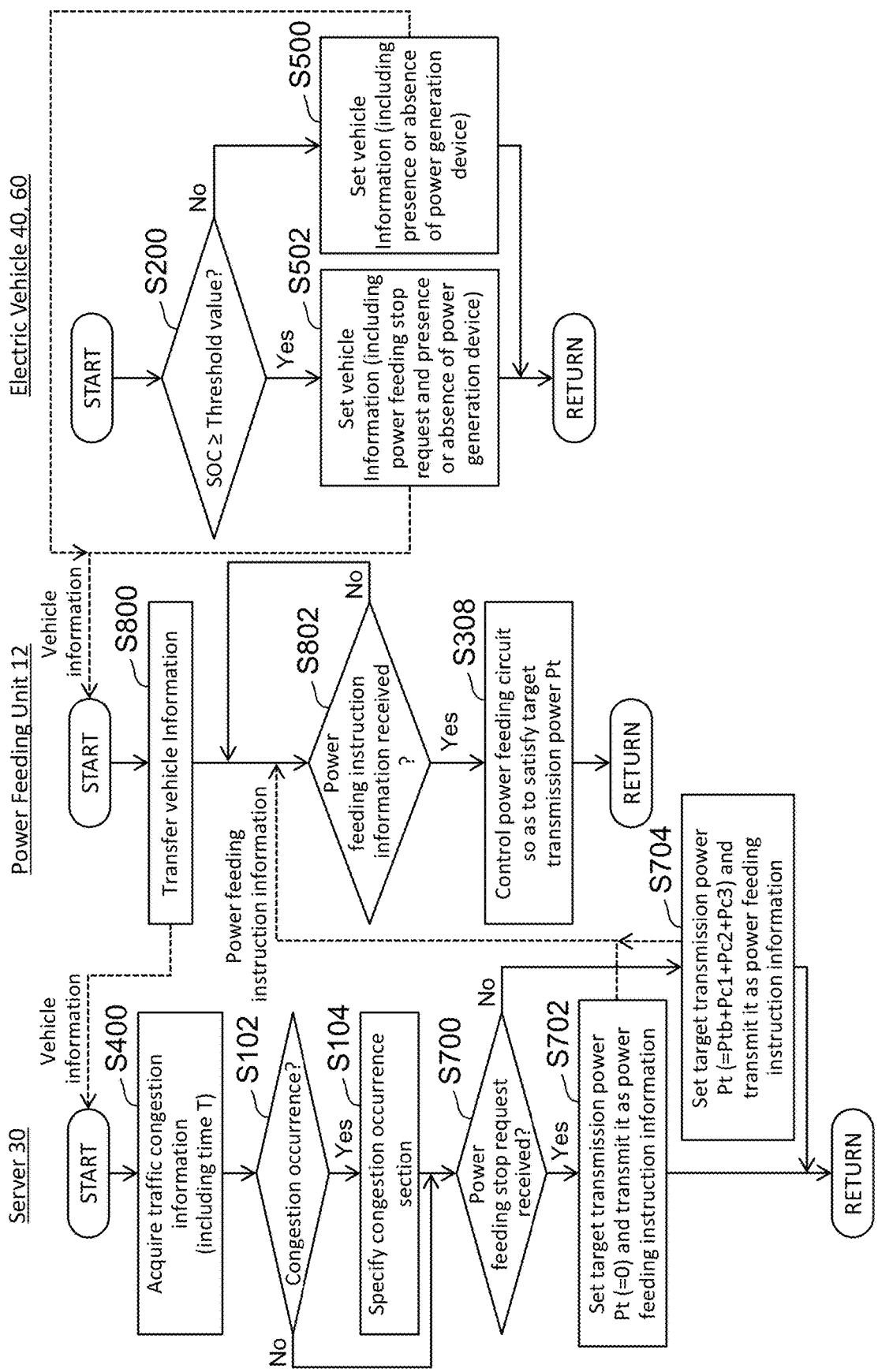
FIG. 7 is a flowchart of a flow of processing relating to the control of the transmission power P according to at least one embodiment of the present disclosure.

FIG. 7 is a flowchart of a process flow relating to the control of the transmission power P according to at least one embodiment. Here, a non-contact power feeding system 1 having the configuration shown in FIG. 1 will be described as an example. The processing relating to the electric vehicles 40 and 60 shown in FIG. 7 is the same as the processing shown in FIG. 4.

Processing for each power feeding unit 14 begins when vehicle information is received. In step S800, ECU 20 transfers the vehicle information received from the electric vehicle 40 or 60 to the server 30 using the communication device 18.

In FIG. 7, processing relating to the server 30 is started when receiving vehicle information from each power feeding unit 14, and is executed for each power feeding unit 14. In step S700 following step S104, ECU 34 determines whether ECU 34 has received a power feeding stop request. This processing is the same as the processing of the step S304.

If the power feeding stop request is received in step S700, the process proceeds to step S702. In step S702, ECU 20, after setting the target transmission power Pt to zero, the target transmission power Pt set (i.e., power feeding instruction information) is transmitted to the power feeding unit 14 which has transferred the vehicle information.

On the other hand, if the power feeding stop request is not received in step S700, the process proceeds to step S704. In the step S704, ECU 34 transmits the following target transmission power Pt (power feeding instruction information) to the power feeding unit 14 which has transferred the vehicle information.

Specifically, when the power feeding unit 14 is located within the non-congestion occurrence section, ECU 34 transmits the target transmission power Pt equal to the base value Ptb as the power feeding instruction information. On the other hand, when the power feeding unit 14 is located within the congestion generation section, ECU 34 transmits the target transmission power Pt obtained by adding the power correction amount Pc1, Pc2 and Pc3 to the base value Ptb as the power feeding instruction information. The calculation of the power correction amounts Pc1-Pc3 by ECU 34 can be performed by the method described above in at least one embodiment.

ECU 20 of the power feeding unit 14 determines whether or not the power feeding instruction information has been received in the step S802 following the step S800. Consequently, when the power feeding instruction information is received, the process proceeds to step S308, ECU 20 controls the power feeding circuit 16 so that the transmission power P of a magnitude satisfying the target transmission power Pt is obtained.

3-2. Effect

According to the processing of the flowchart shown in FIG. 7 described above, the control of the transmission power P including the calculation of the power correction quantity Pc3 considering the type of the electric vehicle (the presence or absence of the power generation device 52) and considering the traffic congestion information is mainly performed by ECU 34 of the servers 30. Controlling the transmission power P in this manner also has the same effect as the above described at least one embodiment.

3-3. Another Example of Server-based Transmission Power P Control

Instead of the example shown in FIG. 7, ECU 34 of the server 30, when the power feeding unit 14 that has transmitted the vehicle information is located within the congestion generation section, the power feeding unit 14, the target transmission power Pt obtained by adding only the power correction amounts Pc1 and Pc3 to the base value Ptb may be transmitted to the power feeding unit 14 as the power feeding instruction information.

Further, instead of the example shown in FIG. 7 performed by ECU 20 of each power feeding unit 14, the control of the power feeding circuit 16 for obtaining the target transmission power Pt (i.e., the command of the target transmission power Pt to the power feeding circuit 16) may be performed by ECU 34 of the server 30 via, for example, the communication device 18.

4. Reference Example

Figure 8:
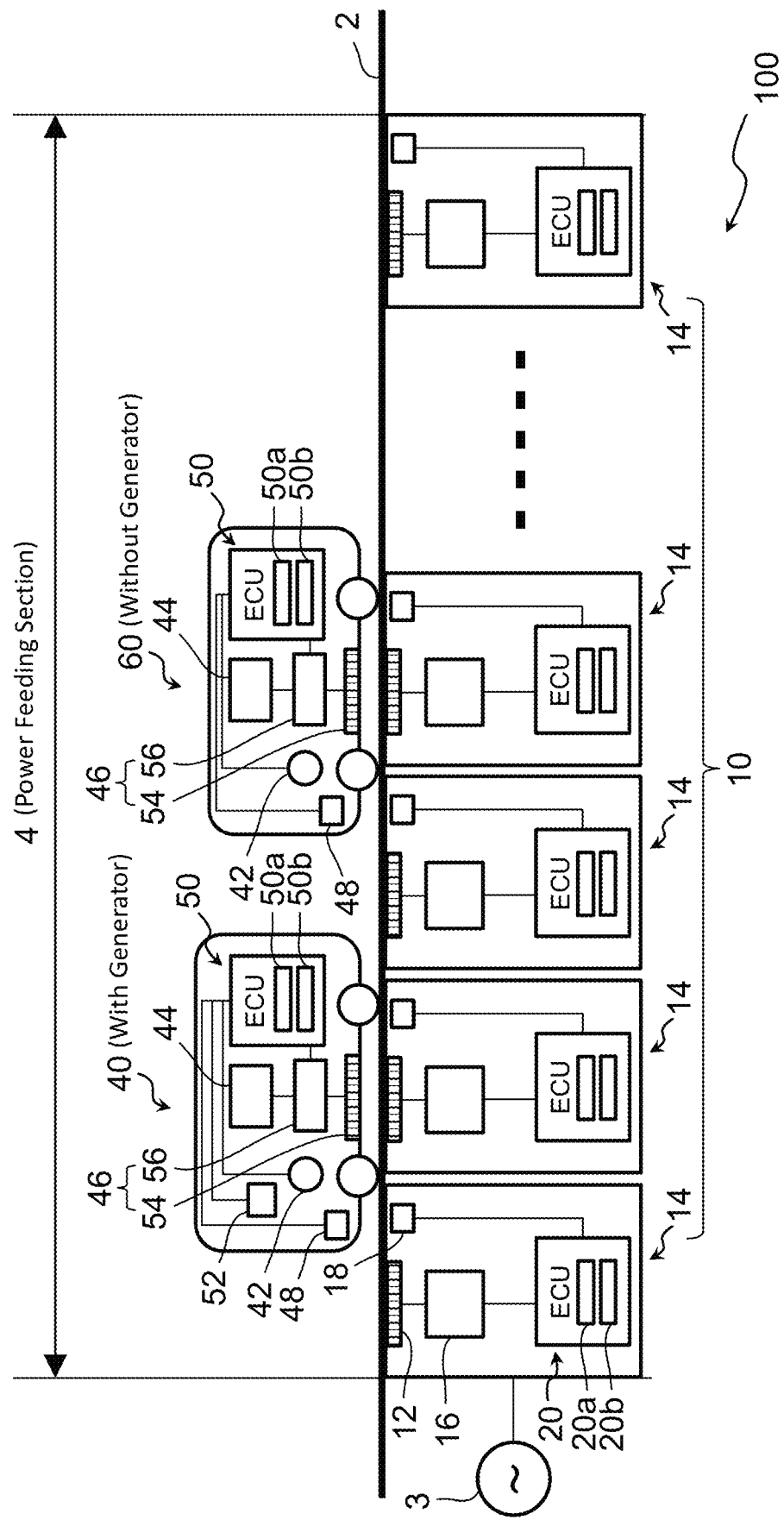
FIG. 8 is a schematic diagram of a configuration of a non-contact power feeding system according to a reference example related to the present disclosure.

Next, a reference example of the control of the transmission power P related to the present disclosure will be described. FIG. 8 is a schematic diagram of a configuration of a non-contact power feeding system 100 according to a reference example related to the present disclosure. The non-contact power feeding system 100 is configured similarly to the non-contact power feeding system 1 shown in FIG. 1, except that it does not include the server 30.

In the setting of the target transmission power Pt according to this reference embodiment, the power correction amount Pc1 and Pc2 based on the traffic congestion information is not used, only the power correction amount Pc3 corresponding to the type of the electric vehicle (presence or absence of the power generation device 52) is used. That is, in this reference example, regardless of the occurrence of congestion, the electronic control unit (e.g., ECU 20) controls the power feeding circuit 16 such that the transmission power P is lower when the electric vehicle traveling in the power feeding section 4 has the power generation device 52 (e.g., electric vehicle 40) than when the electric vehicle traveling in the power feeding section 4 does not have the power generation device 52 (e.g., electric vehicle 60).

Figure 9:
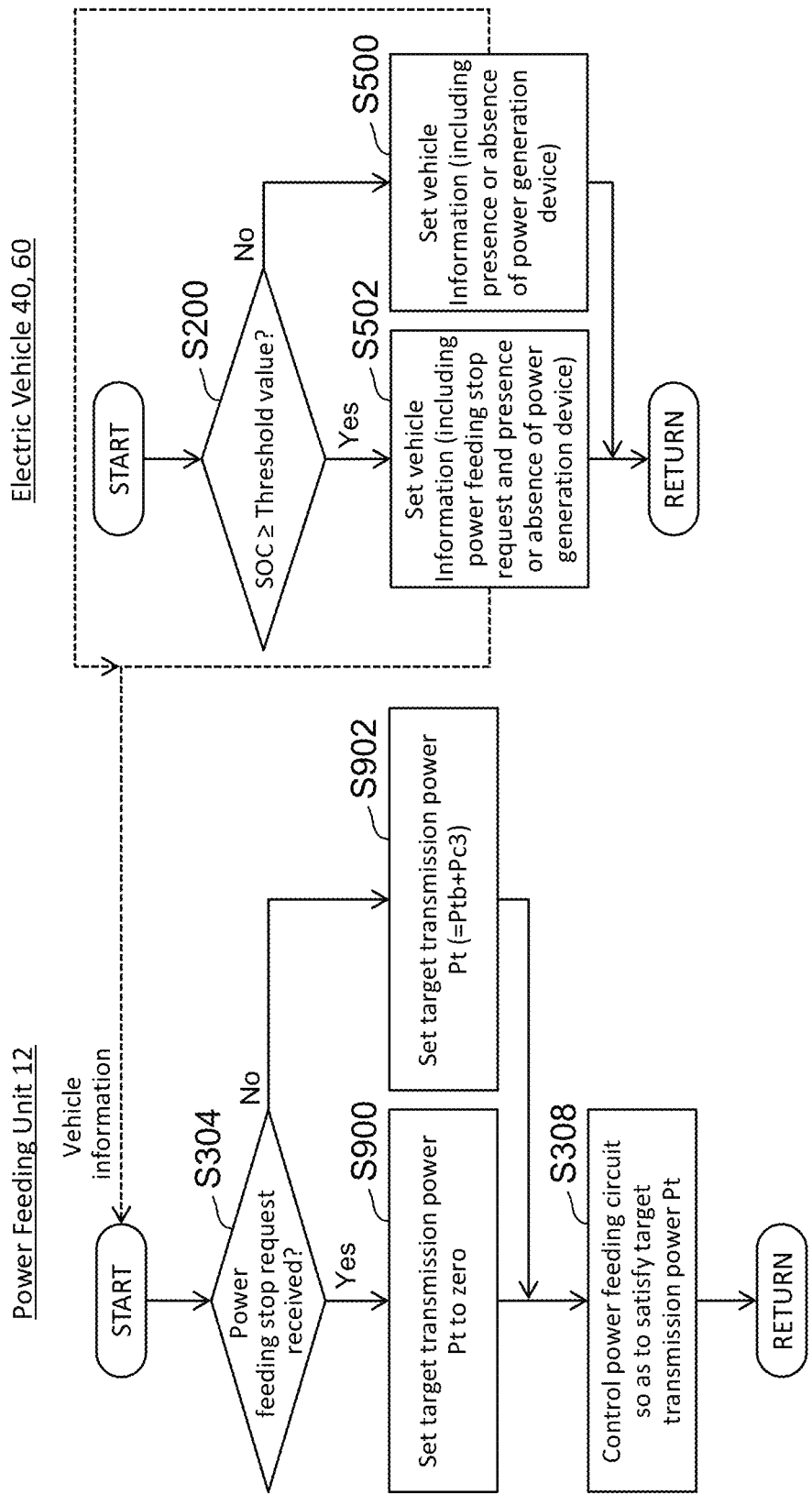
FIG. 9 is a flowchart of a flow of processing relating to the control of the transmission power P according to a reference example related to the present disclosure.

FIG. 9 is a flowchart of a flow of processing relating to the control of the transmission power P according to the present reference example. In this flowchart, the processing related to the electric vehicle 40, 60 is the same as the processing shown in FIG. 4.

Processing for each power feeding unit 14 begins when vehicle information is received. In FIG. 9, first, in step S304, ECU 20 determines whether or not there is the power feeding stop request. Consequently, if the power feeding stop request is received, the process proceeds to step S900 and ECU 20 sets the target transmission power Pt to zero.

On the other hand, if the power feeding stop request is not received in step S304, the process proceeds to step S902. In the step S902, ECU 20 sets the sum of the base value Ptb and the power corrected quantity Pc3 as the target transmission power Pt.

In step S308 following step S900 or S902, ECU 20 controls the feed circuit 16 to obtain a transmission power P of a magnitude that satisfies the target transmission power Pt.

As described above, in the electric vehicle 40 having a power generation device 52, even if the SOC is greatly reduced, generating power spontaneously is possible. Therefore, avoiding electric power shortage is possible. On the other hand, in the electric vehicle 60 having no power generation device 52, when SOC is greatly reduced, electric power shortage is more likely. With respect to the problem of such a reference example, according to the processing of the flowchart shown in FIG. 9, the target transmission power Pt used in the electric vehicle 40 having the power generation device 52 is lower than that used in the electric vehicle 60 having no power generation device 52. As a result, the transmission power P to the electric vehicle 40 is lower than the transmission power P to the electric vehicle 60. Thus, as compared with an example of supplying (transmitting) uniform power to the electric vehicle 40, 60 regardless of the presence or absence of the power generator 52, efficiently supplying a large amount of power to the electric vehicle 60 having no power generator 52 to avoid power shortage while reducing the total value of the power supplied to both the electric vehicle 40, 60 is possible.

What is claimed is:

1. A contactless power feeding system comprising:
   a power feeding device including a plurality of power feeding coils along a road along which an electric vehicle is able to travel, wherein the power feeding device is configured to transmit electric power to a power receiving coil of a power receiving device of the electric vehicle in a contactless manner;
   a receiver configured to receive traffic congestion information of the road; and
   an electronic control unit configured to:
      control transmission power transmitted from each of the plurality of power feeding coils to the power receiving coil, and
      control the power feeding device such that a transmission power of one or more power feeding coils of the plurality of power feeding coils located in a congestion occurrence section is higher than a transmission power of one or more power feeding coils of the plurality of power feeding coils located in a non-congestion occurrence section based on the received traffic congestion information, wherein each of the congestion occurrence section and the non-congestion occurrence section are along a portion of the road including the plurality of power feeding coils, and the transmission power in the non-congestion occurrence section is greater than zero, wherein
   a target transmission power being a target value of the transmission power of each of the plurality of power feeding coils is a sum of a base value and a first power correction amount,
   the first power correction amount for the one or more power feeding coils in the congestion occurrence section is a positive value, and the first power correction amount for the one or more power feeding coils in the non-congestion occurrence section is zero.

2. The contactless power feeding system according to claim 1, wherein
the electronic control unit is further configured to control the power feeding device to increase the transmission power as a time for the electric vehicle to pass through the congestion occurrence section increases,
the target transmission power of each of the plurality of power feeding coils is a sum of the base value, the first power correction amount, and a second power correction amount,
the second power correction amount for the one or more power feeding coils located in the congestion occurrence section is a positive value, and larger when the time is longer than when the time is shorter, and
the second power correction amount for the one or more power feeding coils located in the non-congestion occurrence section is zero.

3. The contactless power feeding system according to claim 1, wherein
the electronic control unit is further configured to control the power feeding device such that the transmission power is lower when the electric vehicle traveling in a power feeding section has a power generation device, than when the electric vehicle traveling in the power feeding section does not have the power generation device, wherein the power feeding section is along a portion of the road and includes the plurality of power feeding coils.

4. A power feeding device comprising:
a plurality of power feeding coils installed along a road which an electric vehicle is able to travel, wherein each of the plurality of power feeding coils is configured to transmit electric power to a power receiving coil of a power receiving device of the electric vehicle in a contactless manner;
a receiver configured to receive traffic congestion information of the road; and
an electronic control unit configured to:
control transmission power transmitted from each of the plurality of power feeding coils to the power receiving coil, and
control energization of the plurality of power feeding coils such that a transmission power of one or more power feeding coils of the plurality of power feeding coils located in a congestion occurrence section of the road, based on the received traffic congestion information, is higher than a transmission power of one or more power feeding coils of the plurality of feed coils located in a non-congestion occurrence section of the road, and the transmission power in the non-congestion occurrence section is greater than zero, wherein
a target transmission power being a target value of the transmission power of each of the plurality of power feeding coils is a sum of a base value and a first power correction amount,
the first power correction amount for the one or more power feeding coils in the congestion occurrence section is a positive value, and
the first power correction amount for the one or more power feeding coils in the non-congestion occurrence section is zero.

5. The power feeding device according to claim 4, wherein
the electronic control unit is further configured to control energization of the plurality of power feeding coils to increase the transmission power as a time for the electric vehicle to pass through the congestion occurrence section increases,
the target transmission power of each of the plurality of power feeding coils is a sum of the base value, the first power correction amount, and a second power correction amount,
the second power correction amount for the one or more power feeding coils located in the congestion occurrence section is a positive value, and larger when the time is longer than when the time is shorter, and
the second power correction amount for the one or more power feeding coils located in the non-congestion occurrence section is zero.

6. The power feeding device according to claim 4, wherein
the electronic control unit is further configured to control energization of the plurality of power feeding coils such that the transmission power is lower when the electric vehicle traveling in a power feeding section has a power generation device, than when the electric vehicle traveling in the power feeding section does not have the power generation device, wherein the power feeding section is along a portion of the road and includes the plurality of power feeding coils.

7. A power feeding management server comprising:
a receiver configured to receive traffic congestion information of a road along which a plurality of power feeding coils are installed; and
an electronic control unit configured to:
control transmission power transmitted from each of the plurality of power feeding coils to a power receiving coil of an electric vehicle, and
control energization of the plurality of power feeding coils such that a transmission power of one or more power feeding coils of the plurality of power feeding coils located in a congestion occurrence section of the road, based on the received traffic congestion information, is higher than a transmission power of one or more power feeding coils of the plurality of power feeding coils located in a non-congestion occurrence section of the road, and
adjust a power transmission of a first power feeding coil of the plurality of power feeding coils based on information indicating whether a target vehicle for receiving power from the first power feeding coil includes a power generation device, wherein
a target transmission power being a target value of the transmission power of each of the plurality of power feeding coils is a sum of a base value and a first power correction amount,
the first power correction amount for the one or more power feeding coils in the congestion occurrence section is a positive value, and
the first power correction amount for the one or more power feeding coils in the non-congestion occurrence section is zero.

8. The power feeding management server according to claim 7, wherein
the electronic control unit is further configured to control energization of the plurality of power feeding coils to increase the transmission power as a time for the electric vehicle to pass through the congestion occurrence section increases, the target transmission power of each of the plurality of power feeding coils is a sum of the base value, the first power correction amount, and a second power correction amount, the second power correction amount for the one or more power feeding coils located in the congestion occurrence section is a positive value, and larger when the time is longer than when the time is shorter, and the second power correction amount for the one or more power feeding coils located in the non-congestion occurrence section is zero.

9. The power feeding management server according to claim 7, wherein the electronic control unit is further configured to control energization of the plurality of power feeding coils such that the transmission power is lower when the electric vehicle traveling in a power feeding section has a power generation device, than when the electric vehicle traveling in the power feeding section does not have the power generation device, wherein the power feeding section is along a portion of the road and includes the plurality of power feeding coils.

10. The power feeding management server according to claim 7, wherein the power generation device is separate from a battery of the target vehicle.

11. The power feeding management server according to claim 7, wherein the power generation device comprises an internal combustion engine or a fuel cell.

* * * * *